United States Patent [19]
Li et al.

[11] Patent Number: 5,955,051
[45] Date of Patent: Sep. 21, 1999

[54] SYNTHESIS OF LITHIUM NICKEL COBALT DIOXIDE

[75] Inventors: Wu Li; John Carleton Currie; Jack Wolstenholme, all of Edmonton, Canada

[73] Assignee: Westaim Technologies Inc., Alberta, Canada

[21] Appl. No.: 08/691,670

[22] Filed: Aug. 2, 1996

[51] Int. Cl.⁶ ............................ C01G 51/00; C01G 53/00
[52] U.S. Cl. ............................................................. 423/594
[58] Field of Search ............................ 423/594; 429/223

[56] References Cited

U.S. PATENT DOCUMENTS

| | | | |
|---|---|---|---|
| 4,302,518 | 11/1981 | Goodenough et al. | 429/104 |
| 4,980,080 | 12/1990 | Lecerf et al. | 204/182.1 |
| 5,160,712 | 11/1992 | Thackeray et al. | 423/138 |
| 5,180,574 | 1/1993 | Von Sacken | 423/594 |
| 5,264,201 | 11/1993 | Dahn et al. | 429/224 |

OTHER PUBLICATIONS

Delmas, et al, "The Cycling Properties of the $Li_xNiCoO$ electrode," J. of Power Sources, 43–44, 1993, no month, pp. 595–602.

Fujita, et al, "$LiNiCoO_2$ Prepared at Low Temperature Using . . . either $LiNo_3$ or LiOH," Jun. 13, 1996, pp. 119–122.

Morales, et al, "Acid–Delithiated Li(NiCo)O₂ . . . Lithium Batteries" J. of Solid State Chem., 113, pp. 182–183, 1994, no month.

Alcantara et al, "Structure and Electrochemical Properties of $Li(NiCo)O_2$," J. Electrochem. Soc., vol. 142(12), Dec. 1995, pp. 3997–3998.

Solid–State Redox Reactions of $LiCoO_2$ (R3m) for 4 Volt Secondary Lithium Cells, Tsutomu Ohzuku* and Atsushi Ueda—J. Electrochem Soc., vol. 141, No.11 Nov., 1994.

Lithium–Cobalt–Nickel–Oxide Cathode Materials Prepared at 400°c for Rechargeable Lithium Batteries, R.J. Gummow and M.M. Thackeray—Solid State Ionics 53–56 (1992) 681–687, no month.

*Primary Examiner*—Steven Bos
*Attorney, Agent, or Firm*—Arne I. Fors

[57] ABSTRACT

A single calcination stage process for the synthesis of homogeneous crystalline lithium nickel cobalt dioxide from either a mechanical mixture of nickel and cobalt oxides, hydroxide or oxyhydroxide or a chemical precipitation of a homogeneous nickel cobalt hydroxide or cobalt nickel cobalt oxyhydroxide is provided. The reactants are calcined in the presence of lithium hydroxide and an alkali metal hydroxide under predetermined oxygen partial pressure and temperature conditions. The products of the process are characterized in having a lithium to transition metal ratio closely approximating to the desired theoretical value.

9 Claims, 8 Drawing Sheets

SYNTHESIS OF LITHIUM NICKEL COBALT DIOXIDE

FIELD OF THE INVENTION

The present invention relates to a single calcination stage process for the synthesis of homogeneous crystalline lithium nickel cobalt dioxide useful in electrochemical cells and to the products prepared thereby.

BACKGROUND OF THE INVENTION

Lithium transition metal oxide powders and, in particular, lithium cobaltic dioxide having a layered structure, form key cathodic materials for the positive electrode (cathode) in rechargeable lithium ion electrochemical cells.

Specific physical, morphological and chemical characteristics are required to sustain the transition metal oxide's performance over many sequential charge and discharge cycles demanded during service. Current battery applications for the powder demand high purity, homogeneity, controlled particle size and low surface area (less than 2.0 $m^2/g$).

Commercial application of the lithiated transition metal oxides, or indeed any cathodic material, is dependant upon the material having a high reversible capacity and conversely a low irreversible capacity, high thermal stability and low cost. Of the three most commonly contemplated compounds, lithium cobaltic dioxide exhibits a high capacity concomitant with a good thermal stability, but it is extremely costly. Lithium nickel dioxide, having a layered structure, possesses high capacity, with low relative cost but is thermally unstable, whereas, lithium manganese oxide ($LiMn_2O_4$ having a spinel structure) is the most thermally stable of the three, when delithiated, and is relatively inexpensive but lacks a high capacity. The use of $LiNi_{j-x}Co_xO_2$, or indeed transition metal mixed metal oxides in general, is contemplated because of the increased thermal stability thereof in comparison with lithium nickel dioxide and its higher electrical capacity in comparison with lithium cobaltic dioxide. The literature abounds in examples of novel lithium ion systems and variations on the methods for the preparation thereof. In U.S. Pat. No. 4,302,518 issued to J. B. Goodenough et al., lithium cobalt dioxide is prepared by calcining a pelletized mixture of lithium and cobalt carbonates in air at 900° C. for several hours. The calcining step may be repeated one or more times to ensure complete conversion to the desired product. The resultant lithiated cobalt dioxide is characterized in having a hexagonal structure with lattice constants a=0.282 nm and c=1.408 nm as described by T. Ohzuku et al. (J. Electrochem. Soc. 141, 2972, 1994). Reaction parameters will determine lattice structures. Thus, as disclosed in Solid State Ionics, 53–56, 681 (1992) by R. J. Gummow et al.,and U.S. Pat. No. 5,160,712 issued to M. M. Thackeray et al., lithium cobalt dioxide prepared by the reaction of lithium and cobalt carbonates in air at 400° C. for between 2 to 5 days yields a product having a cubic structure having the lattice constant a=0.28297 nm (c/a=4.90). The '518 patent further teaches a process for the preparation of lithium nickel dioxide by reacting lithium hydroxide with nickel powder involving multiple regrinding and calcining stages.

In U.S. Pat. No. 4,980,080 issued to A. Lecerf et al., there is described a process for the synthesis of $Li_yNi_{2-y}O_2$ or $LiNi_{1-x}Co_xO_2$. To prepare the $LiNi_{1-x}Co_xO_2$ compound, a physical mixture of hydrated lithium hydroxide and nickel and cobalt oxides are heated in air at a temperature in the range of about 700° C. A reheating step is then undertaken to complete the solid state reaction.

U. von Sacken, in U.S. Pat. No. 5,180,574 discloses a synthetic pathway for the production of lithium nickel dioxide which comprised reacting nickel hydroxide, nickel oxides, or a mixture thereof, with a 25% stoichiometric excess of lithium hydroxide at 600° C. in an atmosphere substantially free of carbon dioxide.

The present Assignees, in a pending application Ser. No. 08/510,421, the disclosure of which is incorporated herein by reference, described a process for the synthesis of lithium cobalt dioxide and lithium nickel dioxide.

SUMMARY OF THE INVENTION

In accordance with the present invention, there is provided a process for the synthesis of $LiNi_{1-x}Co_xO_2$ wherein x ranges between zero and one.

In developing the invention, a primary object was the provision of a process functional to synthesize lithium nickel cobalt dioxides wherein the transition metals were homogeneously distributed therein and concomitant therewith homogeneous, single phase compounds having the desired morphology, large crystal particle size and predetermined surface area. Thus, the process is aimed at providing a lithium to transition metal molar ratio approximating closely to one, for the reasons which will be described hereinafter.

Broadly stated, the invention is a single calcination stage process for the synthesis of a substantially homogeneous, predominantly single phase compound of $LiNi_{1-x}Co_xO_2$ wherein x is greater than zero and less than one, which comprises:

reacting a stoichiometric amount of a cobalt oxide, cobalt hydroxide or cobalt oxyhydroxide, in admixture with a nickel oxide, nickel hydroxide or nickel oxyhydroxide; or reacting a stoichiometric amount of a nickel cobalt oxide, nickel cobalt hydroxide, or nickel cobalt oxyhydroxide, with at least a stoichiometric amount of lithium hydroxide in the presence of an alkali metal hydroxide at a predetermined temperature and at a predetermined oxygen partial pressure, to thereby produce $LiNi_{1-x}Co_xO_2$ having a predetermined crystal particle size, surface area and controlled microstructure.

In order to effectively practise the process of the invention, it is a requirement that, in combination, the synthesis be carried out over a specific temperature range, there be a high oxygen partial pressure which must be experimentally predetermined, and that an alkali metal hydroxide be present. The significant feature of the invention resides on the provision of the alkali metal hydroxide, preferably potassium hydroxide, which functions as a crystallizing solvent.

Advantageously, the synthesis described herein translates in the ability to omit one of the requisite process steps of the prior art processes. Furthermore, the average crystal particle size is increased to up to about thirty microns, or as desired, imparting improved electrochemical properties thereby.

BRIEF DESCRIPTION OF THE DRAWINGS

The present invention will be better understood with reference to the detailed description and examples below and the attached figures, in which.

DESCRIPTION OF THE PREFERRED EMBODIMENT

Figure 1:
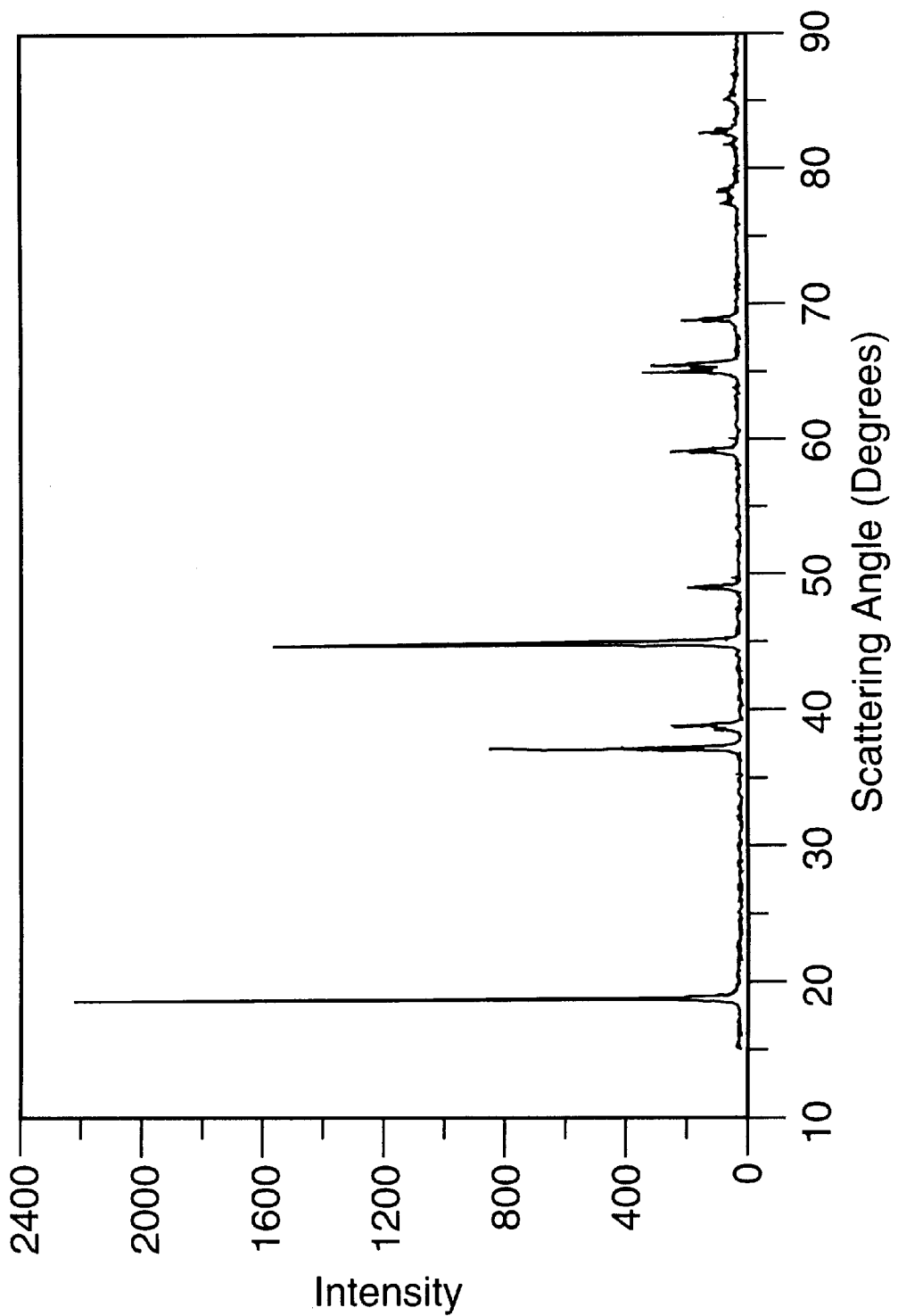
FIG. 1 shows an X-ray diffraction pattern of the substantially homogeneous lithium nickel cobalt dioxide, sample 1 described in example 1.
Figure 2:
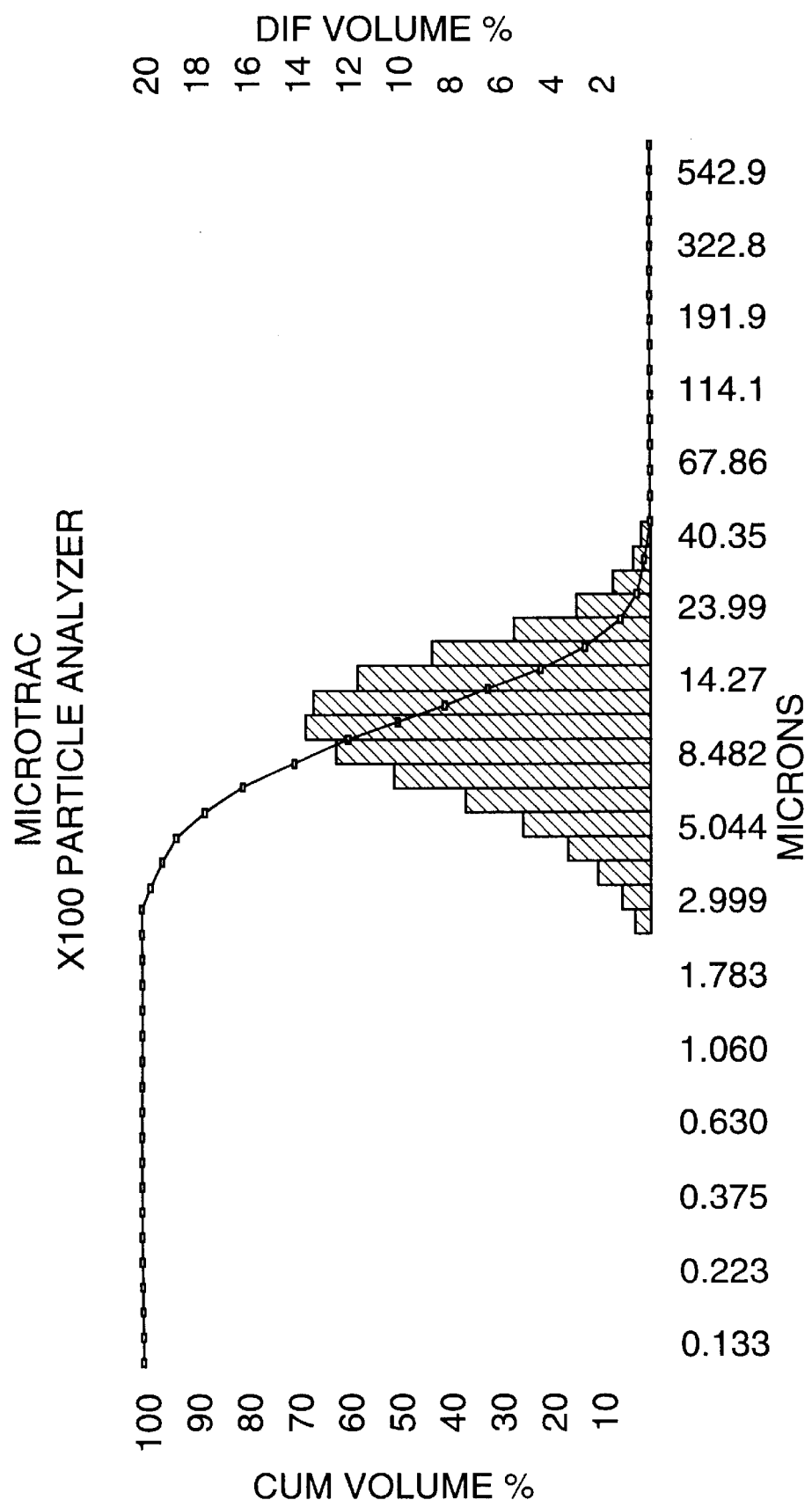
FIG. 2 illustrates the particle size distribution measured by Microtrac™ for sample 1.

The starting materials for the preparation of the lithium nickel cobalt dioxides of the present invention may comprise two distinct types.

The first type comprises a mechanical mixture of suitable nickel oxides, hydroxides or oxyhydroxides in admixture with a stoichiometric amount of suitable cobalt oxides, hydroxides or oxyhydroxides. Exemplary compounds would be selected from CoO; CoOOH, $Co(OH)_2$, $Co_3O_4$ and $Co_2O_3$ or NiO, $Ni(OH)_2$, $Ni_2O_3$, $Ni_3O_4$ and NiOOH.

Alternatively, a chemical mixture which is substantially homogeneous, may be prepared by doping nickel hydroxide with cobalt hydroxide or vice versa to thereby form nickel cobalt oxide, nickel cobalt hydroxide or nickel cobalt oxyhydroxide. Exemplary compounds would include $Ni_{1-x}Co_xOOH$; $Ni_{1-x}Co_xO$; or $Ni_{1-x}Co_x(OH)_2$ and their waters of hydration. Typically, any salts of nickel or cobalt, exemplary of which would be carbonates, oxalates or nitrates which can be decomposed to their oxides prior to the addition of lithium hydroxide and potassium hydroxide, can be utilized as a starting material precursor. Preferably, the selected precursors would not cause side reactions which diminish the availability of the lithium or potassium hydroxides used in the reaction.

A suitable lithium compound for use as a reactant is lithium hydroxide. The more expensive lithium oxide may be operative but is not considered economically viable. The lithium hydroxide could be present in a stoichiometric amount, and more preferably in a stoichiometric excess. The excess amount would range up to about 50 molar weight %.

The amount of potassium hydroxide added, which functions as an additive to impart homogeneity to the resultant product, would range between 0.1% to 50 mole %. Other suitable alkali metal hydroxides may be used. However, potassium hydroxide is preferred.

Reaction temperature is preselected whereby the product forms a solid solution. Typical reaction temperatures would range between about 550° C. to about 900° C., and preferably be about 650° C. to about 800° C.

The reaction is conducted at an oxygen partial pressure about atmospheric and preferably greater than atmospheric. Typical pressures, which must be experimentally predetermined, would range between about 18 kPa to 110 kPa. The reaction must be conducted in a substantially carbon dioxide free environment.

Furnace retention times would range between about 1 h to 100 h depending upon the desired particle size and temperature.

To detail the reasons for the importance of adhering to the particular combination of reaction conditions, it must be appreciated that a major problem in synthesizing $LiNi_{1-x}Co_xO_2$, especially for the nickel-rich compounds, i.e. with x<0.5, is believed to be the avoidance of the creation of a lithium deficiency in the product. In order to achieve this, the preferred lithium to transition metal molar ratio should be as close to 1.0 as possible, and preferably should not be below about 0.97. A lithium deficiency as low as about 5% will severely damage the electrochemical performance of the cathode material.

One also seeks to provide a compound wherein the nickel is present as $Ni^{3+}$ rather than to $Ni^{2+}$ because presence of the latter leads to lithium deficiency in the product which now becomes $Li_{1-y}Ni_{1-x+y}Co_xO_2$.

Therefore, in order to synthesize $Li_{1-y}Ni_{1-x+y}Co_xO_2$ having a lithium to transition metal mole ratio close to 1 (i.e. y is approximately zero), a high oxygen partial pressure is necessary to ensure a high $Ni^{3+}$ percentage in the product. Furthermore, to provide the desired crystal size, the reaction temperature must range between 550° C. to 900° C. Too high a reaction temperature yields crystals which are unsuitable for battery applications, and at too low a reaction temperature crystal growth is too slow to be economic.

The presence of an alkali metal hydroxide, preferably KOH, is required to grow the desired large crystal particle size. To prevent the KOH reacting with carbon dioxide, and thus losing its availability for reaction, the process should be conducted in an essentially carbon-dioxide free atmosphere. Furthermore, carbon dioxide can continue to react with formed $LiNi_{1-x}Co_xO_2$ (for example wherein x<0.33) to form a lithium deficient product.

EXAMPLE 1

This example describes the preparation of $LiNi_{1-x}Co_xO_2$ by reacting lithium hydroxide with nickel and cobalt hydroxides. 118 g of $Co_2O_3 \cdot xH_2O$ (having a cobalt content of 62.5%), 348 g of nickel hydroxide, 231 g of lithium hydroxide monohydrate and 35 g of potassium hydroxide (88% KOH) were admixed using a pestle and mortar. The atomic ratio of Li:Co:Ni:K was 1.1:0.26:0.74:0.1. The mixture was heated at 750° C. for 20 h in an oxygen atmosphere. After heating, the material was deagglomerated and washed with water to remove the potassium hydroxide and any excess lithium hydroxide. The material was then dried in a vacuum oven at 120° C. for 4 h to remove water. The material was then ground and passed through a 400 mesh sieve and analyzed. This product, $LiNi_{1-x}Co_xO_2$, is hereinafter referred to as sample 1.

Figure 3A:
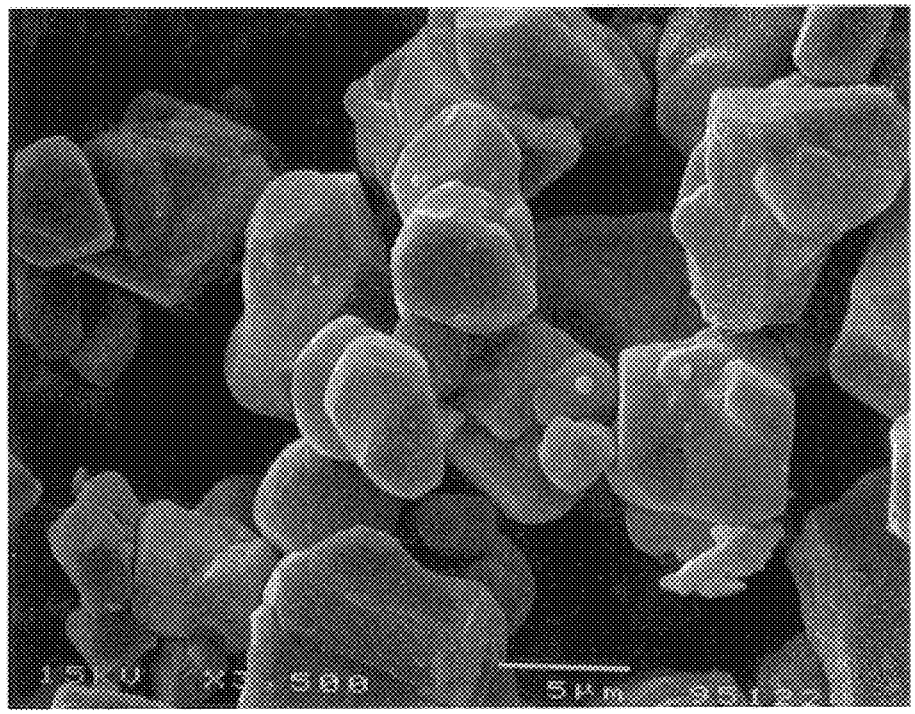
FIG. 3a depicts the scanning electron microphotographs of sample 1 taken at 3500×magnification.

The x-ray diffraction pattern of sample 1 is shown in FIG. 1. The lattice constants were found to be a=0.286 nm and b=1.416 nm which agrees well with data in the technical literature for the $LiNi_{0.74}Co_{0.26}O_2$. Chemical analysis confirms that the product is as stated, namely Li=7.3%,Co+Ni= 59.7%,Co=16% by weight, and Li:Co:Ni=1.02:0.26:0.74. Thus chemical analysis indicates that the lithium to transition metal molar ratio is greater than 0.99. This is supported by the energy dispersive spectrophotometer (EDS) readings. Potassium content was found to be less than 0.01%. EDS readings showed that for 30 particles having crystal particle sizes between 5 to 10 microns, the weight percent of nickel was 44.93 with a variance of 1.65 and the weight percent cobalt was 15.22 having a standard variance of 1.66. FIG. 3a depicts the scanning electron microphotographs of sample 1.

EXAMPLE 2

An electrochemical cell having a cathode, a separator, an anode and an electrolyte was assembled. Conventional 2325 coin cell hardware was used with a spacer and a spring to thereby provide the correct stack pressure. The cathode was made by admixing 90% by weight of the lithium transition metal oxide being tested with 9% by weight Super S carbon black and 1% by weight ethylene propylene diene terpolymer (EPDM) in cyclohexane. The slurry was then spread onto aluminium foil before being allowed to dry. The cathode paste coverage was typically 20 mg/cm$^2$ and the cathode area was 1.25 cm$^2$. The electrolyte was 1M LiBF$_4$ in propylene carbonate, ethylene carbonate and dimethyl carbonate (25:25:50). Lithium metal was used as the anode and Celgard™ 3500 was used as a separator. The charge current was adjusted to correspond to x=0.5 in Li$_{1-x}$NiO$_2$ in 20 hours and the discharge current was adjusted to correspond to x=0.5 in Li$_{1-x}$NiO$_2$ in 10 hours.

EXAMPLE 3

This example, wherein no potassium hydroxide is added to the reactants demonstrates, by comparison with example 1, that the addition of potassium hydroxide improves the homogeneity of the LiNi$_{1-x}$Co$_x$O$_2$ product as well as promoting crystal growth. 70 g Ni(OH)$_2$, 24 g Co$_2$O$_3$.xH$_2$O and 46 g LiOH.H$_2$O having a molar ratio of Li:Ni:Co= 1.1:0.75:0.25 were admixed and treated as in example 1 to thereby yield sample 2.

Figure 3B:
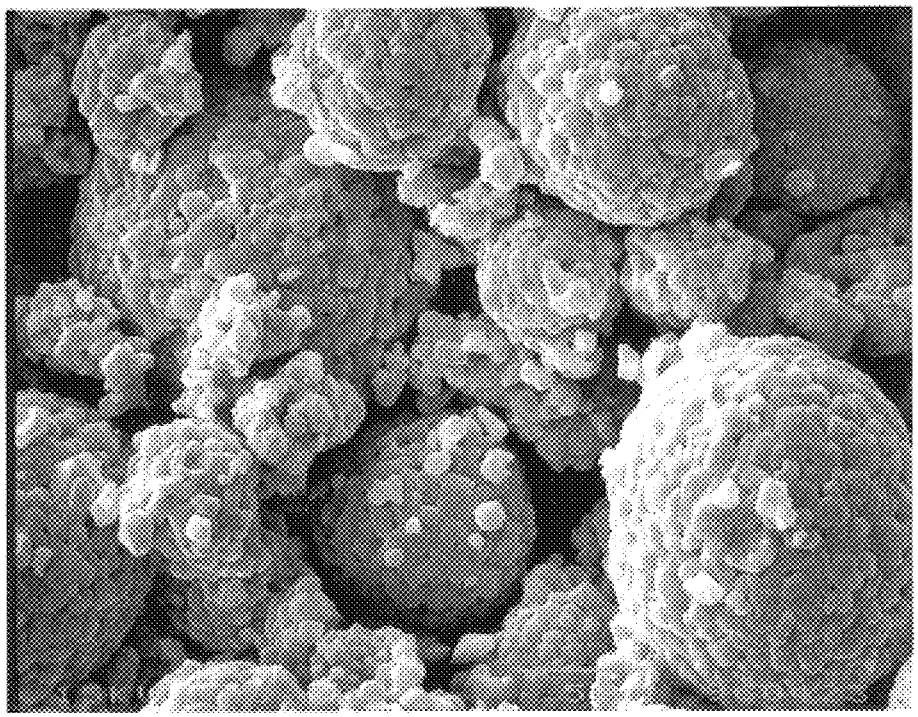
FIG. 3b shows the scanning electron microphotographs of sample 3 taken at 3500×magnification.
Figure 4:
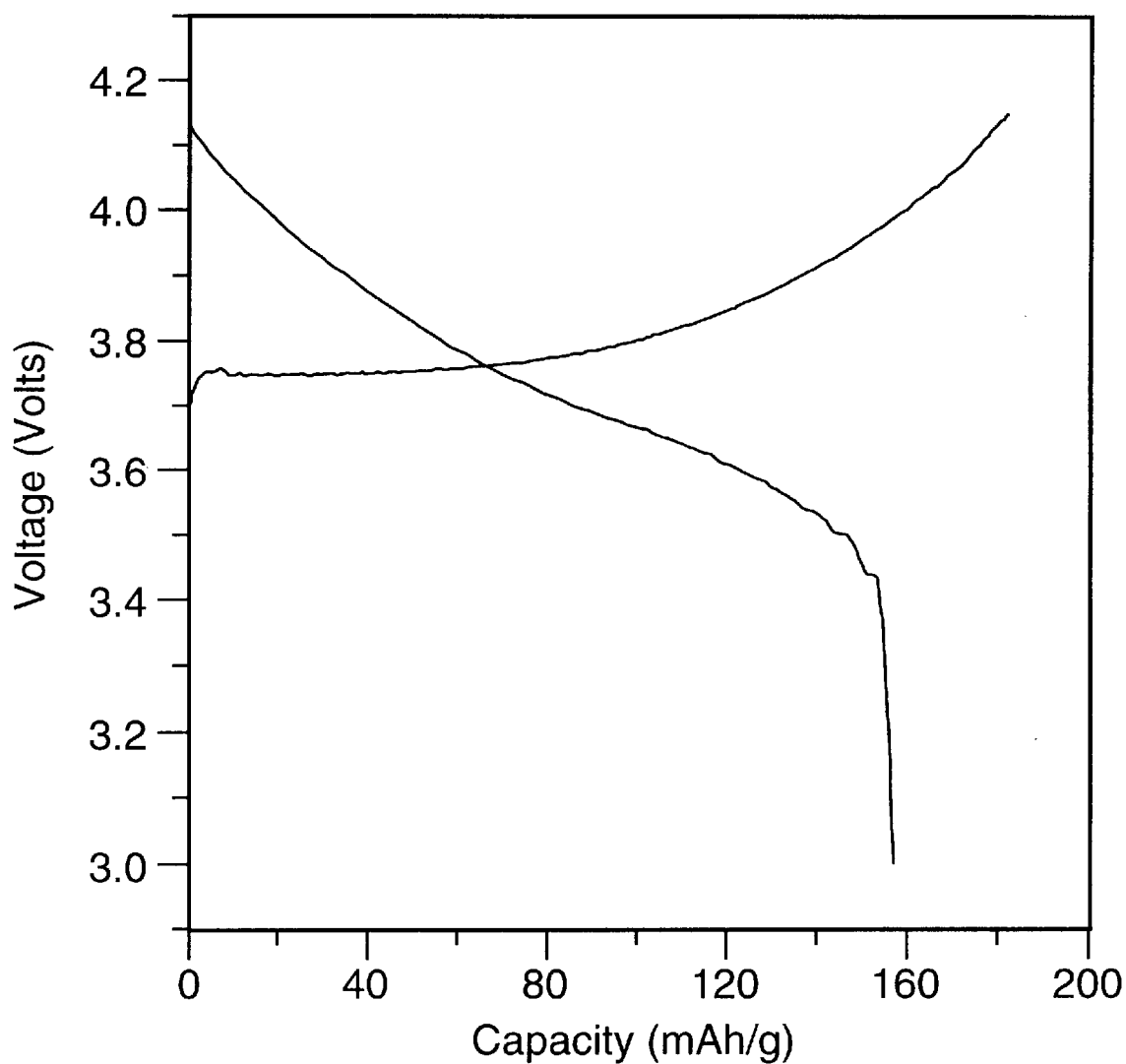
FIG. 4 is a plot of capacity (mAh/g) versus voltage (volts) for the first charge and discharge cycles using sample 1 as the cathode material, wherein the first charge capacity and first discharge capacity are 181 mAh/g and 156 mAh/g respectively.
Figure 5:
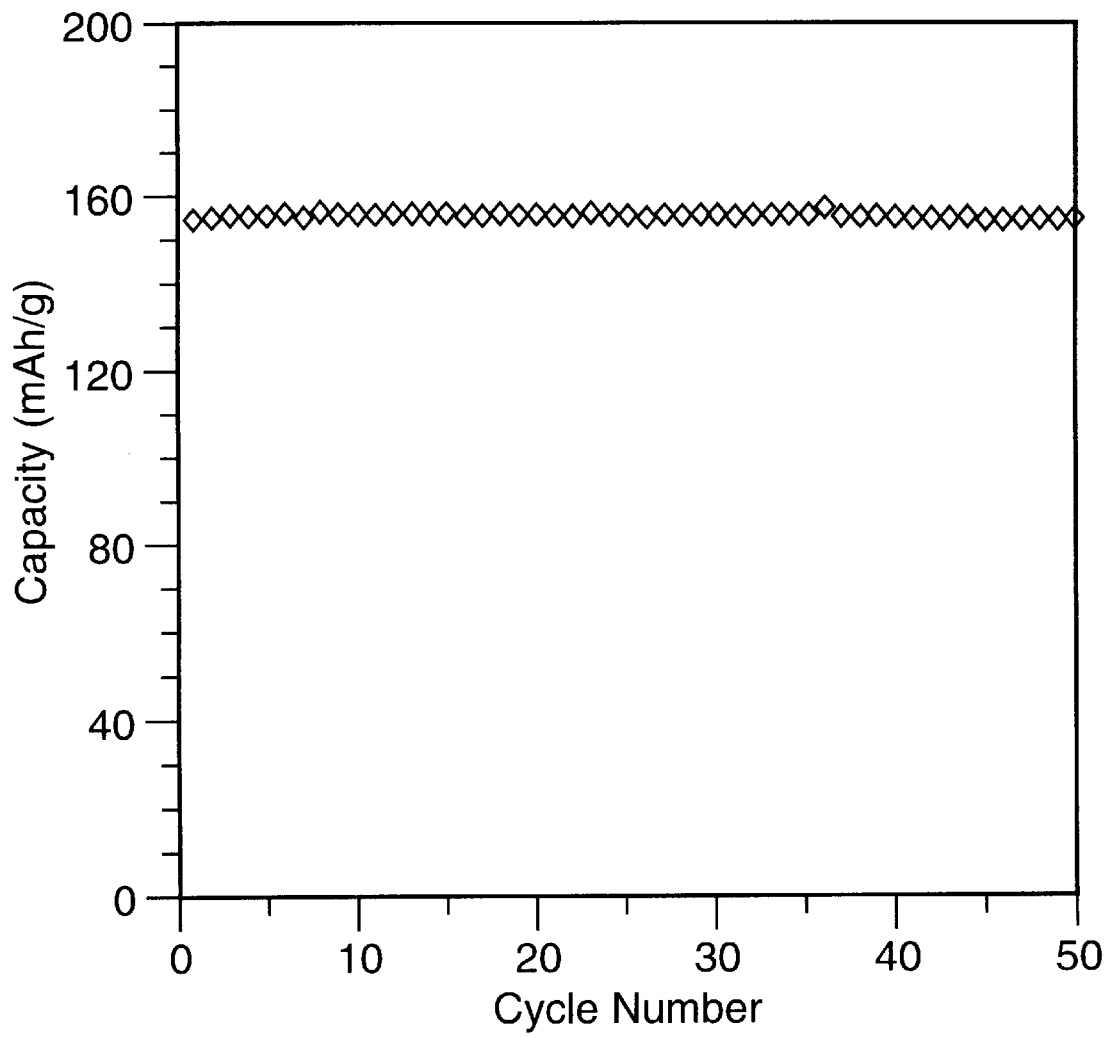
FIG. 5 is a plot of capacity versus cycle number for sample 1 used as the cathode material in the cell of example 2 during cycling between 4.15 V and 3.0V versus lithium.
Figure 6:
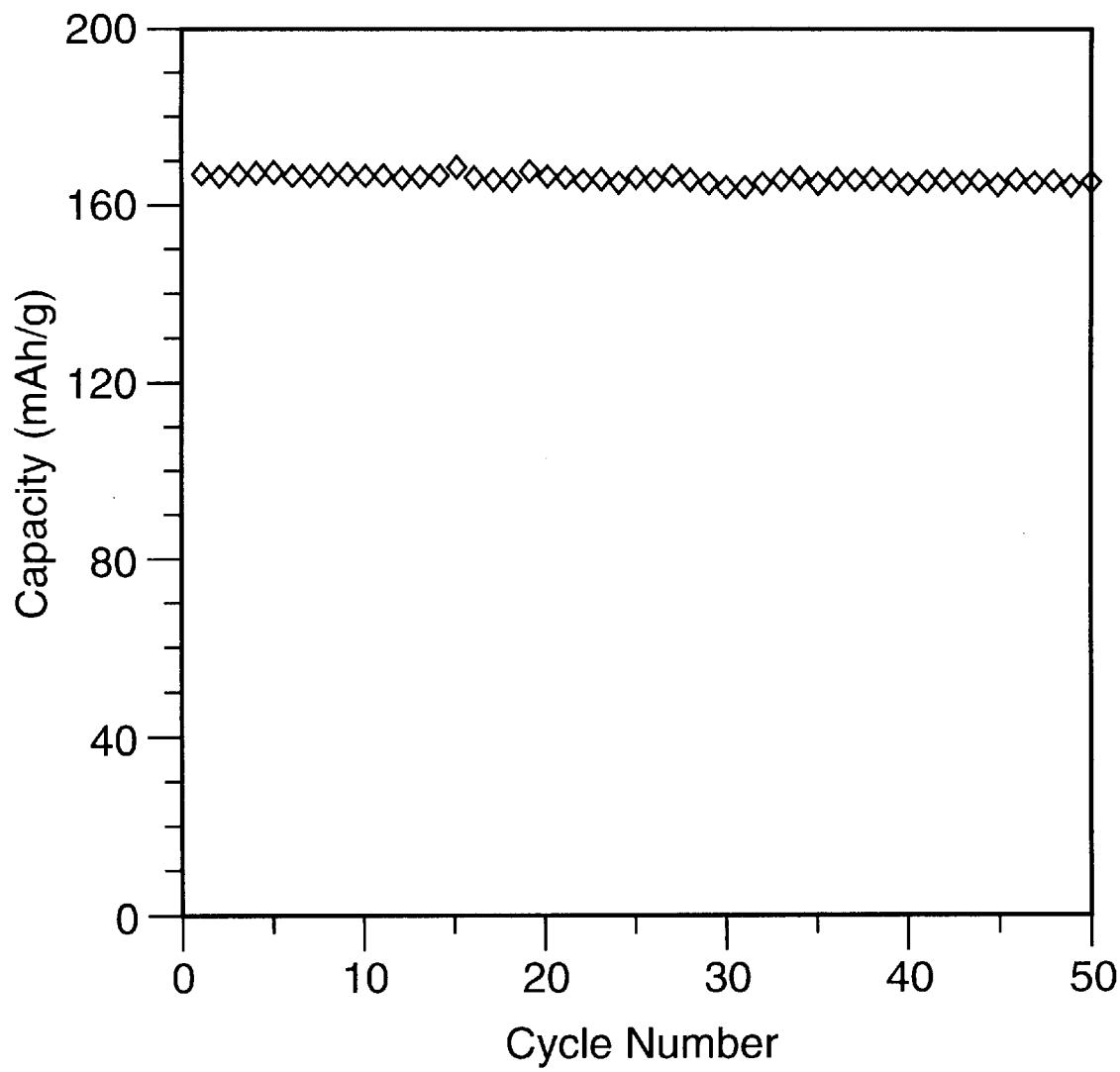
FIG. 6 is a plot of cycle number versus capacity of the cell of example 2 wherein sample 1 is utilized as the cathodic material during cycling between 4.25 V and 3.0V versus lithium.
Figure 7:
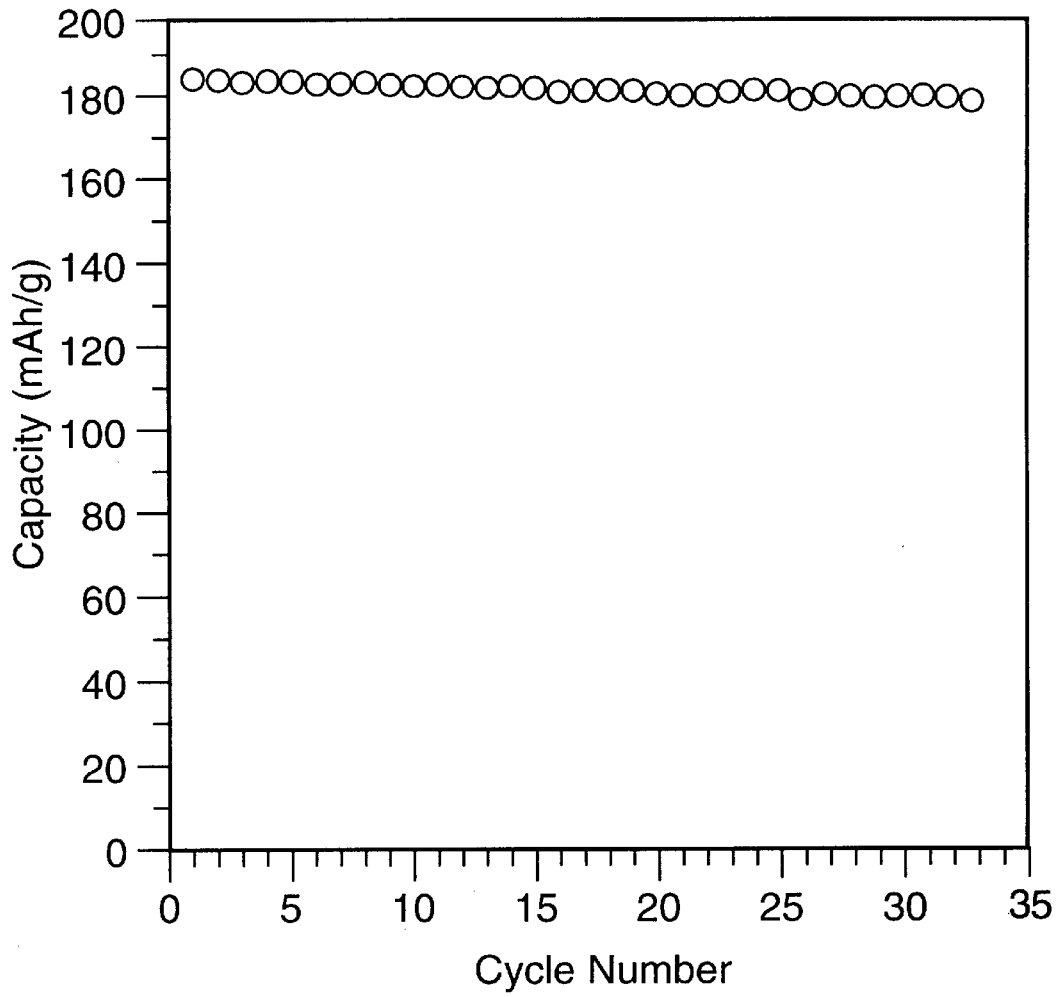
FIG. 7 shows the cycle performance of sample 3 during cycling between 4.3V and 3.0V versus lithium.

X-ray diffraction patterns of sample 2 showed two discernible phases, namely a major phase comprising LiNi$_{1-x}$Co$_x$O$_2$ and a minor phase comprising LiCoO$_2$. Scanning electron micrographs of sample 2, as shown in FIG. 3b, showed an average crystal size of about one micron, as opposed to 10 microns for sample 1, as shown in FIG. 3a.

EXAMPLE 4

This example is included to demonstrate that lithium nickel cobalt dioxide having varying nickel to cobalt ratios may be prepared in the presence of potassium hydroxide.

71 g Co$_2$O$_3$.xH$_2$O, 402 g Ni(OH)$_2$, 229 g LiOH.H$_2$O were admixed and dissolved in 200 g of an aqueous solution containing 28 g KOH providing a slurry having an atomic ratio of Li:Co:Ni:K of 1.1:0.15:0.85:0.1. The mixture was then dried and treated as in example 1 to yield a second product termed sample 3.

X-ray diffraction patterns showed only a single phase of lithium nickel cobalt dioxide in sample 3. Chemical analysis indicated that the atomic ratio of Li:Co:Ni was 1.0:0.15:0.85 thus correlating well with its theoretical value. The final potassium content was found to be less than 0.01%. Scanning electron photomicrographs showed a crystal size of about ten microns.

EXAMPLE 5

This example is provided to illustrate that such physical properties as crystal size and surface area are controllable by means of reaction temperature whilst the desired lattice structure is obtained at the same time.

118 g Co$_2$O$_3$.H$_2$O, 348 g Ni(OH)$_2$, 231 g LiOH.H$_2$O and 35 g KOH were well admixed and calcined at 700° C. for 20 h in a stream of oxygen to thereby provide sample 5.

X-ray diffraction patterns of sample 5 showed only a single phase. The observed lattice constants were a=0.286 nm and b=1.416 m. The crystal size was determined to be approximately 4 microns, and the surface area was found to be 0.5 m$^2$/g. Using the electrochemical cell described in example 2, the cell charged to 4.15V and discharged to 30V, with a discharge current density of 0.25 mA/cm$^2$. The first charge capacity and first discharge capacity were about 182 mAh/g and 155 mAh/g respectively.

EXAMPLE 6

A method for the preparation of nickel cobalt hydroxide (Ni$_{1-x}$Co$_x$(OH)$_2$ will now be detailed. The nickel/cobalt solution was prepared by dissolving the equivalent amount of nickel sulphate hexahydrate and cobalt sulphate heptahydrate in water to provide the desired concentrations of 75 g/L nickel and 25 g/L cobalt. The sodium hydroxide/ammonia solution was prepared by dissolving the equivalent amounts of sodium hydroxide in water and adding the equivalent amounts of ammonium hydroxide to produce a solution containing 115 g/L NaOH and 21 g/L NH$_3$ representing a NaOH:NH$_3$ mole ratio of 70:30 in solution. It is at this ratio that the desired coarse particle size of the precipitate is obtained.

The nickel/cobalt sulphate feed solution was pumped into a reaction vessel at a rate of 20 mL/min with a continuous overflow discharge. The sodium hydroxide/ammonia solution was pumped into the vessel simultaneously to control the pH of the reaction slurry between 10.2 to 10.5 using an automatic pH controller. The temperature of the slurry was maintained at 70° C. The retention time of the reaction slurry in the vessel was approximately 20 minutes. The precipitation products were collected, filtered and washed several times prior to oven drying at 120° C. for several hours. The final nickel and cobalt contents were confirmed by chemical analysis.

EXAMPLE 7

This example teaches that nickel cobalt hydroxide, may be used as an alternative to the combination of nickel hydroxide and cobalt dioxide as a starting material.

366 g of nickel cobalt hydroxide prepared by the method described in example 6, was mixed with 185 g of LiOH.H$_2$O and 29 g of KOH provided in a mole ratio of Ni$_{1-x}$Co$_x$(OH)$_2$:LiOH.H$_2$O:KOH of 1.0:1.1:0.11 with x=0.25. The mixture was then treated as per example 1 giving sample 7.

Chemical analysis of sample 7 was similar to that of sample 1. X-ray diffraction indicated only a single phase of lithium nickel cobalt dioxide. Average crystal size measured about ten microns. The electrochemical performance of sample 7 was similar to that of sample 1.

EXAMPLE 8

This example demonstrates the preparation of lithium nickel dioxide by the reaction of nickel cobalt hydroxide in the absence of potassium hydroxide.

98 g of nickel cobalt hydroxide was mixed with 46 g of lithium hydroxide monohydrate to provide a mole ratio of 1.0 to 1.1 respectively. The reactants were treated as in example 1. Results indicated the existence of a single phase product, however, the average crystal size was about one micron.

EXAMPLE 9

385 g nickel cobalt hydroxide (Co content 20.5% and Ni content 40.6%) were mixed with 185 g of LiOH:H$_2$O and 29 g of KOH to provide a mole ratio of $Ni_{1-x}Co_x(OH)_2$:$LiOH.H_2O$:KOH of 1.0:1.1:0.11. The mixture was then treated as in example 1 to yield sample 9.

Chemical analysis determined that the mole ratio of Li:Ni:Co was 1.04:0.67:0.33 which correlates well with the theoretical value. The final potassium content was found to be less than 0.01%. X-ray diffraction measurements illustrated the presence of only a single phase lithium nickel cobalt dioxide compound. The average crystal particle size was determined by scanning electron microphotographs to be of the order of ten microns.

EXAMPLE 10

Figure 8:
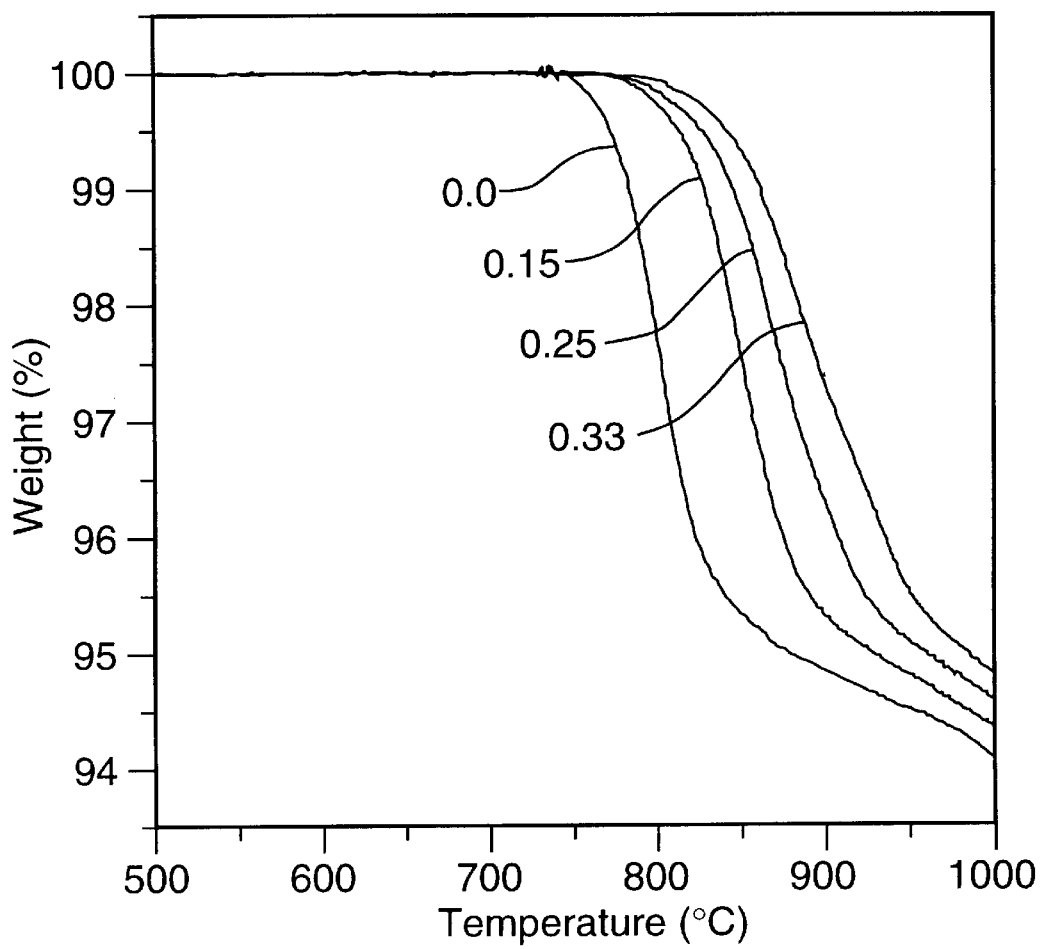
FIG. 8 is a plot of weight loss versus temperature for lithium nickel cobalt dioxide samples having various values of x in $LiNi_{1-x}Co_xO_2$.

Thermo-gravimetric analysis (TGA) experiments demonstrated that lithium nickel cobalt dioxide containing a higher cobalt content exhibited greater thermal stability than those wherein the value of x was lower. This is illustrated in FIG. 8 of the accompanying drawings.

It will be understood, of course, that modifications can be made in the embodiment of the invention illustrated and described herein without departing from the scope and purview of the invention as defined by the appended claims.

We claim:

1. A single calcination stage process for the synthesis of a substantially homogeneous, predominantly single phase compound of $LiNi_{1-x}Co_xO_2$ wherein x is greater than zero and less than one, which comprises:

reacting cobalt oxide, cobalt hydroxide or cobalt oxyhydroxide in admixture with a stoichiometric amount of nickel oxide, nickel hydroxide or nickel oxyhydroxide with at least a stoichiometric amount of lithium hydroxide, in the presence of 0.1 mole % to 50 mole % of potassium hydroxide relative to the $LiNi_{1-x}Co_xO_2$ or reacting nickel cobalt oxide, nickel cobalt hydroxide or nickel cobalt oxyhydroxide; with at least a stoichiometric amount of lithium hydroxide, in the presence of 0.1 mole % to 50 mole % of potassium hydroxide relative to the $LiNi_{1-x}Co_xO_2$, at a temperature in the range of 550° to 990° C. and at an oxygen partial pressure in the range of 18 KPa to 110 KPa in a substantially carbon dioxide-free atmosphere, to thereby produce $LiNi_{1-x}Co_xO_2$ having a lithium to transition metal molar ratio of about 1.0 and an average crystal particle size in the range of one to 30 microns.

2. The process as set forth in claim 1 wherein said starting material comprising cobalt oxide, cobalt hydroxide or cobalt oxyhydroxide, in admixture with a nickel oxide, nickel hydroxide or cobalt oxyhydroxide is prepared using mechanical mixing.

3. The process as set forth in claim 1 wherein said starting material comprising a nickel cobalt oxide, nickel cobalt hydroxide, or nickel cobalt oxyhydroxide is prepared using chemical precipitation to thereby yield a homogeneous compound.

4. The process as set forth in claim 1 wherein said potassium hydroxide is present in the amount of about 2.0 mole % to about 20 mole %.

5. The process as set forth in claim 2 wherein said reaction temperature ranges between about 650° C. to about 800° C.

6. The process as set forth in claim 3 wherein said reaction temperature ranges between about 650° C. to about 800° C.

7. The process as set forth in claim 1 wherein said lithium hydroxide is present in a stoichiometric excess in a range of up to about 50% excess thereof.

8. A single phase homogeneous lithium nickel cobalt dioxide prepared by the process of claim 2.

9. A single phase homogeneous lithium nickel cobalt dioxide material having an average crystal particle size ranging from between about one to thirty microns, having the nickel substantially present as $Ni^{3+}$, and a lithium to transition metal molar ratio about 1.0 and not less than about 0.97.

* * * * *